United States Patent [19]

Rohlik

[11] Patent Number: 4,550,555

[45] Date of Patent: Nov. 5, 1985

[54] CROP GUIDING ATTACHMENT FOR A COMBINE DIVIDER

[76] Inventor: John W. Rohlik, R.R. 1, Box 75, Vesta, Minn. 56292

[21] Appl. No.: 636,975

[22] Filed: Aug. 2, 1984

[51] Int. Cl.[4] .......................................... A01D 63/00
[52] U.S. Cl. ..................................................... 56/314
[58] Field of Search .............................. 56/314–320, 56/119

[56] References Cited

U.S. PATENT DOCUMENTS

| | | |
|---|---|---|
| 930,617 | 8/1909 | Riley . |
| 1,878,941 | 9/1932 | Lindgren . |
| 2,466,555 | 4/1949 | Paine et al. . |
| 2,679,719 | 6/1954 | Hill .................................. 56/314 |
| 2,739,824 | 3/1956 | Kooiker . |
| 3,214,894 | 11/1965 | Whitman . |
| 3,967,439 | 7/1976 | Mott .................................. 56/314 |
| 4,199,927 | 4/1980 | Craig et al. . |
| 4,296,593 | 10/1981 | Webb et al. . |
| 4,330,983 | 5/1982 | Moore . |
| 4,330,984 | 5/1982 | Hillmann . |

OTHER PUBLICATIONS

Sperry-New Holland product catalog.
International Harvester product catalog.
Allis–Chalmers product catalog.

*Primary Examiner*—Jay N. Eskovitz
*Attorney, Agent, or Firm*—Merchant, Gould, Smith, Edell, Welter & Schmidt

[57] ABSTRACT

An attachment for a floating crop divider of the type used on a harvester having a transverse frame and reel with opposite upright sidewalls with the floating crop divider including a conically shaped divider shroud extending forward from an open end which includes opposite shroud sidewalls to a snout, the attachment consisting of a plurality of tines mounted to the inside sidewall of the shroud to extend toward the center of the reel. The tines each include a spring like axis of flexure near their mounting end, to permit them to bend resiliently in both their horizontal and vertical axis. Mounting brackets are provided to attach the tines to the inside sidewall of the shroud, with one bracket bolted to the inside sidewall of the shroud and another bracket bolted to the opposite outside sidewall of the shroud, with a brace member extending therebetween, to provide added lateral and vertical rigidity to the tines.

7 Claims, 3 Drawing Figures

CROP GUIDING ATTACHMENT FOR A COMBINE DIVIDER

TECHNICAL FIELD OF THE INVENTION

The present invention relates generally to crop dividers for the header of a harvester and more particularly to an attachment for a crop divider for diverting crops away from the ends of a combine reel.

BACKGROUND OF THE INVENTION

Combine headers of the type including a rotating reel for poising crops or plants and moving them up into the header are in widespread use. Row dividers are often employed with such headers for separating, dividing and guiding crops at the edge of a header swath. While row dividers are important for efficient harvesting of grains and like crops, they are even more important in the harvesting of vine crops, such as soybeans, in which the swath edges must be accurately separated and untangled. Failure to properly separate and untangle can result in either lost crop or end wrap on the reel, the latter of which must be cleared periodically from the reel while harverting, resulting in a loss of harvesting time and potential danger to the operator.

State of the art dividers designed for use on soybean harvesting combines typically have relatively long forward extensions of a generally conical shape forming a dividing point snout, and are pivoted at the point of attachment to the header frame. Dividers of this type, however, and more specifically for instance this type used in connection with John Deer 200 ® Series combines, have been found generally ineffectual in guarding against end wrap, not withstanding their "high rise" design. Soybean crop routinely works in behind the open end of the divider shroud and wraps on the end of the reel. It has been found, however, that extending the divider further rearward causes it to interfere with the reel, and that extending the divider inward toward the center of the reel requires substantial reinforcement of the shroud to prevent deformation, both of which potential solutions are therefore undesireable.

SUMMARY OF THE INVENTION

The present invention provides a crop guiding attachment for a crop divider of the above-described type as used in harvesting soybeans. According to one aspect of the invention the attachment includes tine means and means for mounting the tine means to the divider near its open end to extend inwardly toward the center of the header, the tine means including means permitting them to deflect rearwardly under extreme crop-load conditions.

According to another aspect of the invention the tine means further include means permitting them to deflect downwardly if interfering with said reel.

According to yet another aspect of the invention first and second mounting members are provided for attachment to the inside and outside shroud sidewalls respectively, with the second mounting member being positioned rearwardly of the first member. A brace member is provided and is connected to both the first and second members to extend across the open end of the divider shroud to provide lateral rigidity for said inside sidewall, and said first mounting member. Tine means are mounted to the first mounting member to extend laterally inward toward the center of the reel for deflecting crops from the inside sidewall toward the center of the reel whereby end wrap is prevented, with the tine means including means permitting them to deflect rearward under extreme crop-load conditions, and downward if interfering with the reel.

According to one aspect of the invention the tine means are formed of spring steel rod and are wound to form an annular spring near the mounting end thereof, with a rod being mounted such that the axis of the spring is generally perpendicular to the ground to permit relatively greater resiliency in the horizontal axis than in the vertical axis of the rod.

Thus, the present invention provides an attachment which may be added to divider apparatus used in soybean harvesting to deflect the vines toward the center of the reel and thereby avoid end wrap. Also, the flexure of the tines in both axes of movement avoids permanent deformation or damage to the tines, shroud or reel, as will be explained in more detail hereinlater.

DETAILED DESCRIPTION OF THE INVENTION

Figure 1:
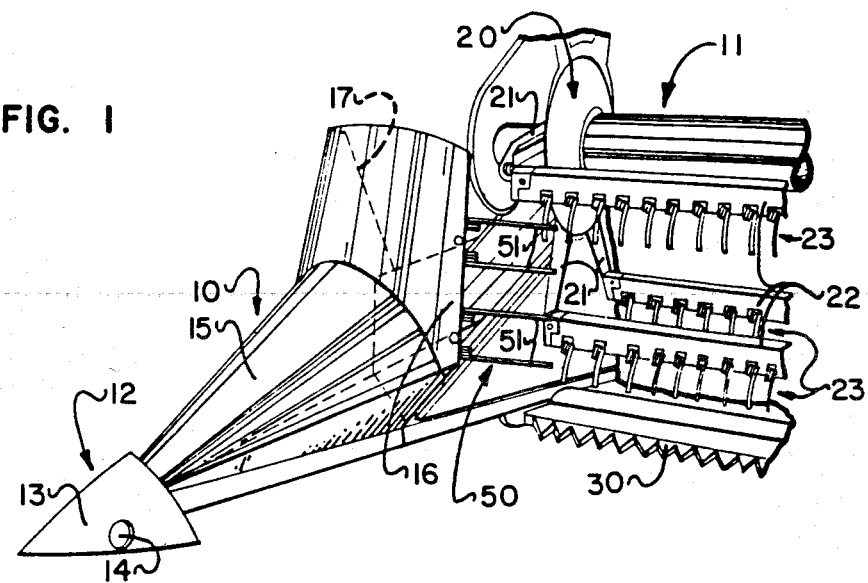
FIG. 1 is a perspective view of one end of a typical soybean harvesting combine with the attachment of the present invention attached to the divider shroud.
Figure 2:
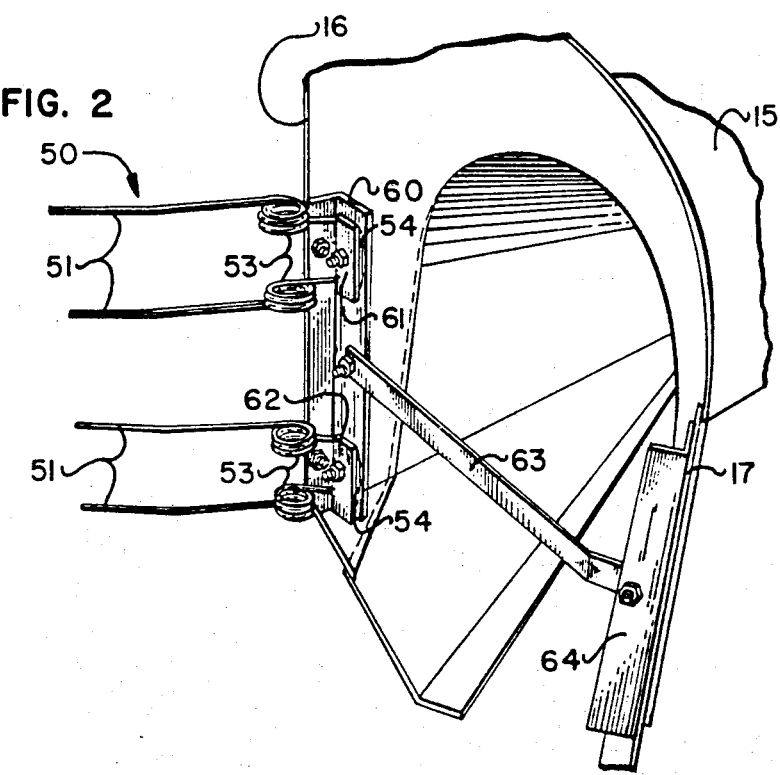
FIG. 2 is a perspective view of the rearward open end of the divider shroud with the attachment of the present invention mounted thereto.
Figure 3:
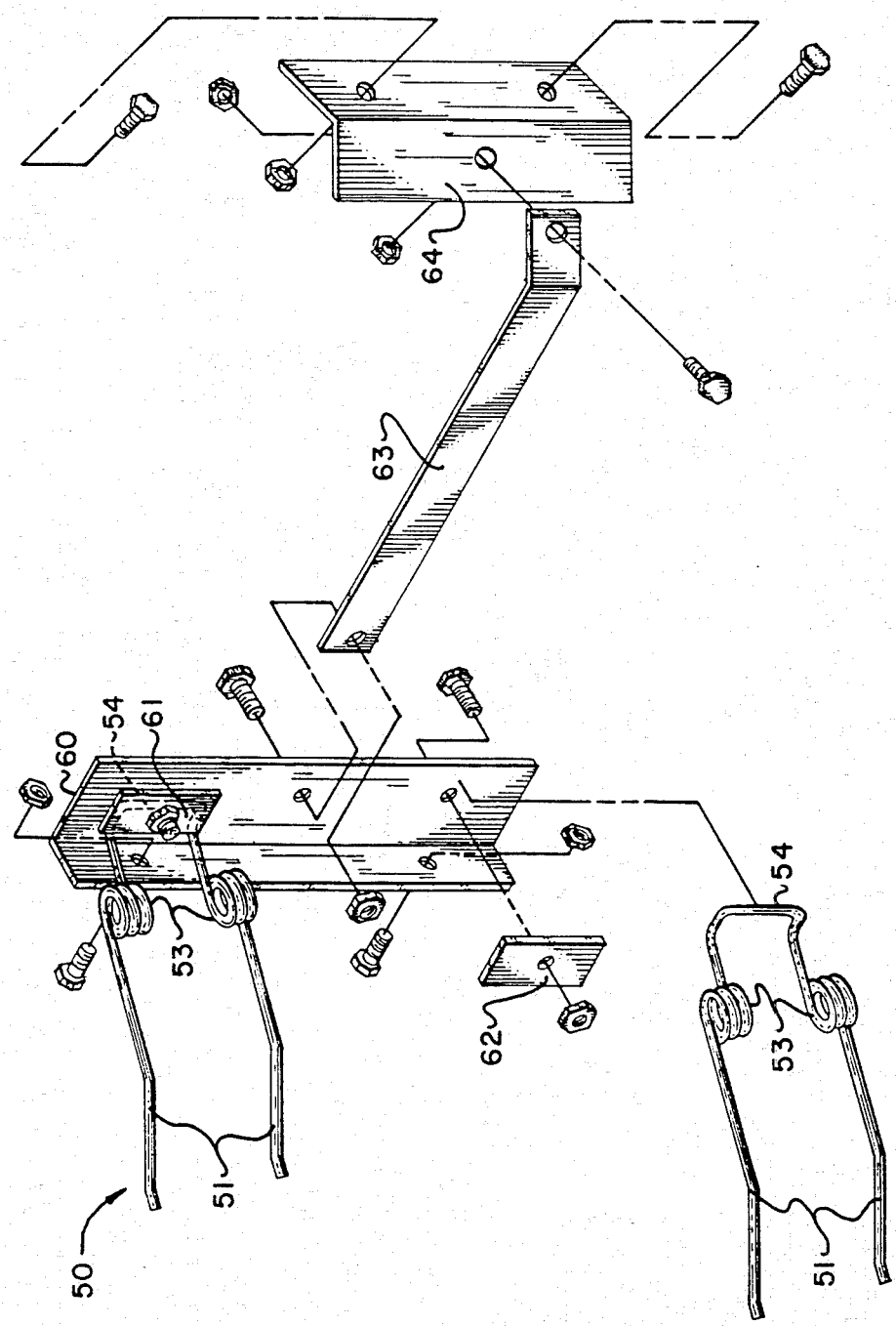
FIG. 3 is an exploded perspective view of the crop guiding attachment of the present invention.

Referring to FIGS. 1, 2 and 3, in which like elements have like reference numerals, the crop guiding attachment and its implementation according to the present invention is illustrated. The invention is specifically adapted for the harvesting of soybean crops, although its usefulness is certainly not limited in this regard, and as illustrated is specifically adapted for use on John Deere ® combines, particularly Series 200 models. It shall be understood, however, that with minor changes the invention may be adapted for use on other types and brands of combine equipment.

As is commonly provided on other soybean and small grain harvesting equipment, the John Deere ® 200 Series models include a divider 10 (on each end) which is pivotably mounted to the header 11, to permit the divider to "float" with respect to the header 11 as the combine traverses uneven ground. Divider 10 includes a forward snout 12 having a generally conical skid 13, which is mounted to pivot about a lateral axis 14. A shroud 15 of generally conical shape extends rearward from the snout 12 and includes an upwardly extend "high rise" portion forming an inside and outside sidewalls 16 and 17 respectively, with sidewall 17 extending rearward along the outside of the combine header and sidewall 16 terminating forward of the reel 20.

Reel 20 includes a plurality of spoke members 21 extending from the hubs on either end thereof. Supported between spokes 21 are a plurality of rungs 22 which each include a plurality of laterally spaced apart sets of fingers 23. Thus, reel 20 operates in the usual fashion to set up and poise crops in the path of the header, and move them toward the auger so that the crops may be cut and processed in the usual manner.

The crop guiding attachment according to the present invention is generally designated with reference numeral 50. A plurality of tines 51 are fastened to shroud 15 with mounting members 61-64 to extend horizontally or laterally from sidewall 16 toward the center of the header, at an angle recessed from the transverse axis of the header in the range of 30 to 60 degrees. Thus, the tips of tines 51 are normally positioned slightly rearward with respect to the header than the mounting ends thereof.

Each of tines 51 is slightly bent around the middle thereof with a slight bend in the reverse direction around the tip thereof, as may be seen best with respect to FIG. 3. It shall be understood, however, that the exact shape shown is not essential to the invention. Each of tines 51 is wound to provide an axis of resilient flexure, with the axis being perpendicular to the ground, such that a tine may flex or deflect backwards toward the reel under an extreme crop-load, thereby avoiding destructive stress on the sidewalls 16 and 17 of shroud 15, especially sidewall 16, and the possible permanent deformation of a tine. Preferrably, tines 51 are formed of spring steel, such that flexure axis 53 further provide for resilient flexure along an axis horizontal to the ground, which is especially important in avoiding damage to both a tine or to the rungs or fingers 23 where a flexure of the divider or tines causes them to interfere with the reel apparatus.

Preferrably, the tines 51 are provided in pairs, with each pair provided by a single length of spring steel round stock bent in the middle thereof to form a mounting end 54. As shown, mounting end 54 is attached to mounting member 60 via a mounting plate 61 or 62 in the corresponding nuts and bolts therefore. Mounting member 60 is angled and one portion thereof is mounted to sidewall 16 via nuts and bolts or any other suitable means. A reinforcement bracket 63 is provided and extends across the open end of shroud 15 to a further mounting bracket 64, which is bolted to the inside of sidewall 17 rearward of mounting member 60, to provide both lateral and vertical rigidity for the inside sidewall 16 and member 60, and consequently tines 51.

In operation, divider 10 floats forward of header 11 on skid 13 dividing and directing crop both around the outside of the header and up along its inside sidewall toward the center of the header and reel. Crop moving up along the inside of divider 10 on shroud 15 is guided up along sidewall 16, and is then deflected via tines 51 toward the center of reel 20, thus preventing it from working in behind shroud 15 and wrapping around the ends of reel 20, and in particular spokes 21. The angled mounting of the tines 51 provides that crops may readily slide toward the header with a minimum of tine flexure. Moreover, as explained above, under extreme load tines 51 deflect rearward to prevent the permanent deformation of the tines or the sidewall 16 of shroud 15. In addition, tines 51 may also flex in an axis perpendicular to the ground, such that should a tine be flexed rearward into interference with fingers 23 or any other portion of reel 20, the tines may give way and thereby avoid damage to the header, tines or divider shroud.

Although the invention has been illustrated with respect to details of its structure and function, it shall be understood that changes may be made in detail in structure without departing from the spirit and scope of the invention as set forth in the claims apended hereto.

I claim:

1. A crop guiding attachment for a crop divider of the type used on a harvester having a transverse frame and reel, said crop divider extending forward from a relatively wide rear end to a relatively narrow snout, said attachment comprising crop guiding tines and means for mounting said tines to the rear end of said divider to extend laterally inward toward the center of the header for deflecting crops travelling along the inside of the sidewall toward the center of the reel whereby end wrap is prevented, each of said tines formed from resilient metal rod bent to form an annular spring near the mounting end thereof, said spring providing a resilient flexure point permitting said tines to move temporarily rearward under extreme crop-load conditions and permitting said tines to move temporarily downward if interfering with said reel.

2. A crop guiding attachment for a crop divider of the type used on a harvester header having a transverse frame and reel, said crop divider including a conically shaped shroud extending forward from an open end including opposing inside and outside sidewalls to a snout, said attachment comprising a first mounting member for attachment to the inside sidewall, and a second mounting member connecting said first mounting member to said outside sidewall to provide lateral rigidity for said inside sidewall and said first mounting member, and tines mounted to said first mounting member to extend laterally inward toward the center of the header for deflecting crops traveling along the inside sidewall toward the center of the reel whereby end wrap is prevented, each of said tines formed of resilient metal rod bent to form an annular spring near the mounting end thereof, said tines being mounted so that the axis of said spring is generally perpendicular to the ground to provide a resilient flexure point for permitting temporary rearward deflection thereof under extreme load conditions and for permitting temporary downward deflection thereof if interfering with said reel.

3. A crop guiding attachment according to claim 2 wherein said tines extend rearwardly in addition to laterally inward to enable the sliding of said crops therealong into the header.

4. A crop guiding attachment for a crop divider of the type used on a harvester header having a transverse frame and reel, said crop divider including a conically shaped shroud extending forward from an open end including opposing inside and outside sidewalls to a snout, said attachment comprising first and second mounting members for attachment to the inside and outside sidewalls respectively, said second mounting member being positioned rearward of said first member, said first and second mounting members being connected together by a brace member extending across said open end to provide lateral rigidity for said inside sidewall and said first mounting member, and tines mounted to said first mounting member to extend laterally inward toward the center of the reel for deflecting crops traveling along the inside sidewall toward the center of the reel whereby end wrap is prevented, each of said tines formed of resilient metal rod bent to form an annular spring near the mounting end thereof, said tines being mounted so that the axis of said spring is generally perpendicular to the ground to provide a resilient flexure point for permitting rearward deflection thereof under extreme load conditions and for permitting temporary downward deflection thereof if interfering with said reel.

5. A crop guiding attachment according to claim 3 wherein said tines extend rearwardly in addition to laterally inward to enable the sliding of said crops therealong into the header.

6. A crop guiding attachment for a crop divider of the type used on a harvester having a transverse frame and reel, said crop divider extending forward from a relatively wide rear end to a relatively narrow snout, said attachment comprising crop guiding tines and means for mounting said tines to the rear end of said divider to extend laterally inward toward the center of the header for deflecting crops travelling along the inside of the sidewall toward the center of the reel whereby end wrap is prevented, each of said tines including spring means near the mounting end thereof, said spring means for providing a resilient flexure point permitting said tines to move temporarily rearward under extreme crop-load conditions and permitting said tines to move temporarily downward if interfering with said reel.

7. A crop guiding attachment for a crop divider of the type used on a harvester having a transverse frame and reel, said crop divider extending forward from a relatively wide rear end to a relatively narrow snout, said attachment comprising crop guiding tines and means for mounting said tines to the rear end of said divider to extend laterally inward toward the center of the header for deflecting crops travelling along the inside of the sidewall toward the center of the reel whereby end wrap is prevented, each of said tines including flexing means near the mounting end thereof, said flexing means for providing a resilient flexure point permitting said tines to move temporarily rearward under extreme crop-load conditions and providing horizontal stability for said tines and permitting said tines to move temporarily downward if interfering with said reel.

* * * * *